United States Patent [19]

Czerwinski et al.

[11] Patent Number: 4,552,909

[45] Date of Patent: Nov. 12, 1985

[54] THIXOTROPIC COMPOSITIONS COMPRISING LEATHER FIBERS AND METHOD FOR RENDERING POLYMERIC COMPOSITIONS THIXOTROPIC

[75] Inventors: Richard W. Czerwinski, Nashville; Graham W. Gregory; Richard H. Miller, both of Old Hickory; Stanley A. Rafalowski, Jr., Nashville, all of Tenn.

[73] Assignee: Genesco Inc., Tenn.

[21] Appl. No.: 654,592

[22] Filed: Sep. 26, 1984

[51] Int. Cl.$^4$ .............................................. C08L 89/06
[52] U.S. Cl. ..................................... 524/11; 106/155; 106/156; 106/161
[58] Field of Search ................. 524/11; 106/155, 156, 106/161

[56] References Cited

U.S. PATENT DOCUMENTS

| | | | |
|---|---|---|---|
| 1,020,498 | 3/1912 | Henderson | 524/11 |
| 1,235,819 | 8/1917 | Lawrence et al. | 106/156 |
| 1,302,810 | 5/1919 | Kirschbraun | 106/156 |
| 1,409,301 | 3/1922 | King et al. | 106/156 |
| 1,901,145 | 3/1933 | Christensen | 106/156 |
| 1,958,479 | 5/1934 | Hazell et al. | 524/11 |
| 1,995,179 | 3/1935 | Holm | 524/11 |
| 2,114,300 | 4/1938 | Gustin et al. | 524/11 |
| 2,253,991 | 8/1941 | Strachovsky | 106/155 |
| 2,381,774 | 8/1945 | Riefenstahl | 524/11 |
| 2,600,461 | 6/1952 | Backus | 106/156 |
| 2,643,234 | 6/1953 | Backus | 106/242 |
| 2,808,398 | 10/1957 | Forward | 106/155 |
| 3,542,705 | 11/1970 | Mason et al. | 524/559 |
| 4,287,252 | 9/1981 | Dimiter | 106/156 |
| 4,350,723 | 9/1982 | Sugimura et al. | 428/42 |
| 4,359,078 | 11/1982 | Egan | 106/33 |

FOREIGN PATENT DOCUMENTS

| | | | |
|---|---|---|---|
| 53-62801 | 6/1978 | Japan | 524/11 |
| 5741 | of 1887 | United Kingdom | 524/11 |
| 13128 | of 1915 | United Kingdom | 524/11 |
| 586232 | 3/1947 | United Kingdom | 524/11 |
| 842492 | 7/1960 | United Kingdom | 524/11 |

Primary Examiner—Ronald W. Griffin
Attorney, Agent, or Firm—Sughrue, Mion, Zinn Macpeak & Seas

[57] ABSTRACT

Thixotropic compositions and methods for forming the same are disclosed. The thixotropic agent consists essentially of leather fibers.

51 Claims, 12 Drawing Figures

THIXOTROPIC COMPOSITIONS COMPRISING LEATHER FIBERS AND METHOD FOR RENDERING POLYMERIC COMPOSITIONS THIXOTROPIC

BACKGROUND OF THE INVENTION

1. Field of the Invention

The present invention relates to thixotropic compositions comprising leather fibers as a thixotropic agent and to a method for rendering compositions thixotropic.

2. Description of the Prior Art

The desirability of thickening liquids for use in certain applications has been recognized in the prior art and it has been proposed to thicken a variety of liquids by incorporating therein inert inorganic materials such as mica, diatomaceous earth, talc, alumina, graphite, and the like, and, in particular, silica aerogels and asbestos have been used to achieve a thixotropic effect.

For example, U.S. Pat. No. 2,260,625 Kistler proposes to thicken oily liquids such as lubricating oils to convert the same into greases by adding a silica aerogel.

U.S. Pat. No. 2,892,730 Kloepfer et al proposes thickening organic liquids containing high molecular weight film formers with oxides of silicon, aluminum and titanium.

U.S. Pat. No. 2,610,960 Nordlander proposes rendering polymerizable organic liquids thixotropic by incorporating vermiculite.

U.S. Pat. No. 2,887,461 Horst proposes rendering laminating compositions thixotropic by adding silica aerogels.

One objective of many of the above patents is to overcome the problem of drainage of composition away from coated or filled objects or articles to which the composition has been applied.

U.S. Pat. No. 3,525,689 Marotta discloses a number of prior art references dealing with thixotropic compositions; the specific concept of Marotta involves using the combination of a specified silica material and chrysotile asbestos.

Other references dealing with thickened or gelled compositions, none of which are based upon the use of leather fibers as a thixotropic agent, include U.S. Pat. No. 3,417,018 Burns (use of mineral loughlinite), U.S. Pat. No. 3,714,041 Asgeirsson (colloidal silica in combination with particulate inorganic solids such as asbestos) and U.S. Pat. No. 2,887,461 Hort (use of a silica aerogel).

U.S. Pat. No. 4,350,723 Sugimura et al discloses peel-up type adhesives which comprise a rubber latex or resin emulsion which is film-forming and contains a fibrous material such as, e.g., collagen fibers obtained from the skins of beasts. Thickeners may be used but the thickeners do not include leather fibers. Further, the adhesives of Sugimura et al contain no volatile solvent, have a high inherent viscosity and in no fashion are suggested as being thixotropic.

U.S. Pat. No. 2,114,300 Gustin et al relates to molding compositions which include four basic ingredients: a filler, a gummy adhesive, Celluloid or a cellulose derivative and a drying oil or lubricant. The inert filler is disclosed as comprising leather fiber. When it is considered that it is mandatory to use a gummy adhesive in combination with Celluloid or a cellulose derivative, it is apparent that the compositions of Gustin et al could not be thixotropic in the sense of the present invention.

It has been known to use ground leather in drilling fluids in the prior art. See API BUL 13F, First Addition, August 1978. However, such ground leather is completely different from the leather fibers of the present invention.

Leather fibers have been used in making substitute leather products, reconstituted leather board, floor coverings and certain types of coating. Illustrative references dealing with the same include U.S. Pat. Nos. 1,302,810 Kirschbraum; 2,114,300 Gustin et al; 2,543,925 Monath; 2,601,671 Wilson et al; 2,643,234 Backus; 2,934,477 Highberger et al; 3,294,581 Hervey; 3,542,705 Mason et al; and 4,162,966 Parrini et al. None of these references disclose or suggest in any fashion that leather fibers could be used as a thixotropic agent.

SUMMARY OF THE INVENTION

The present invention provides a thixotropic composition comprising a liquid material and leather fibers.

The present invention further provides a method for forming a thixotropic composition which comprises blending the liquid material and leather fibers.

The present invention finally provides a method for rendering a liquid material thixotropic which comprises adding thereto leather fibers.

One object of the present invention is to provide novel thixotropic compositions, methods for forming such thixotropic compositions and methods for rendering compositions thixotropic.

A further object of the present invention is to provide compositions and methods as above described which permit the use of a non-toxic stable thixotropic agent, namely, leather fibers.

Yet a further object of the present invention is to enable one to form thixotropic compositions using, as a thixotropic agent, what has been considered a waste or by-product in the leather industry.

Yet another object of the present invention is to permit one to formulate thixotropic compositions which completely avoids the use of asbestos.

A further object of the present invention is to permit one to formulate thixotropic compositions of high stability and excellent thixotropic properties using very low amounts of thixotropic agent, i.e., leather fibers.

A further object of the present invention is to provide thixotropic compositions and methods for forming the same which show improved product stability during storage and after use and which exhibit improved temperature stability over extended periods of time, most especially as compared to thixotropic compositions comprising asbestos as a thixotropic agent where viscosity can vary with the passage of time.

Yet another object of the present invention is to provide thixotropic compositions which exhibit superior adhesion and bond strength.

Still yet a further object of the present invention is to provide thixotropic compositions which provide a final product which is more flexible than similar thixotropic products comprising asbestos or cellulosic materials as a thixotropic agent. It appears that the leather fibers of the present invention act as an antioxidant.

The leather fiber thixotropic agent of the present invention finds particular application as a thixotropic agent for polymeric solutions, as are later discussed, and it is one object of the present invention to thus provide such thixotropic compositions which are equal to or superior to thixotropic compositions which are based upon asbestos.

DESCRIPTION OF PREFERRED EMBODIMENTS

In the context of the present invention, the term "thixotropic" is used herein to denote the property of water or organic liquids containing the thixotropic agent of the present invention, i.e., leather fibers, to thicken and to change rapidly, on standing, from a liquid into a gel-like solid mass or body having sufficient cohesive force to withstand distortion by gravitational force when suspended freely in an inverted receptacle or on a coated object. The gel is also of such a nature that it can be fluidized by the application of mechanical agitation as by shaking, stirring, vibrating, and the like. The property of thixotropy as understood herein is thus characterized by a reversable isothermal sol$\rightleftharpoons$gel transition.

Turning first to the nature of the liquid material used per the present invention, the exact identity thereof is not overly important and, it is believed, such can be freely selected from liquid materials as have been used in the prior art to form thixotropic compositions.

In the context of the present specification and claims, the term "liquid" refers to a substance which under dispersion conditions and prior to the addition thereto of the leather fiber thixotropic agent of the present invention (1) flows continuously in response to shear stresses applied thereto, (2) does not recover substantially when said shear stresses are removed, and (3) maintains substantially constant volume at constant temperature.

The general nature of the liquid material selected will, of course, be determined by the ultimate end use contemplated for the thixotropic composition of the present invention.

A partial, but as will be appreciated by one skilled in the art, not complete, listing of potential uses for the thixotropic compositions of the present invention includes use as a caulking putty, a sealant, a filler such as a wood filler or a putty, a thickened and/or gelled flammable liquid fuel, asphaltic plastigels, greases, asphalts or asphalt products, adhesives, mastics and like materials.

Most preferred uses for the thixotropic composition of the present invention are currently contemplated as being directed to coatings, adhesives, sealants, mastics or caulks.

A coating is a material, usually liquid, used to form a covering film over a surface. Its function is typically to decorate and/or protect the surface from destructive agents or environments, e.g., abrasives, chemicals in general including solvents, corrosive materials in general, weathering, etc.

An adhesive is typically considered any substance which is used to promote and maintain a bond between two materials. To function, an adhesive must bond both mating surfaces through specific adhesion (molecular attraction), through mechanical anchoring, e.g., where tendrils penetrate into voids in a porous surface, or through fusion, e.g., partial dissolution of both surfaces to be bonded by the adhesive or a solvent vehicle for the adhesive.

A mastic is typically a heavy-bodied adhesive of such consistency that it must be applied by a notched trowel, a gob method or a buttering method.

Sealants are high solid content materials comprising a synthetic elastomeric polymer which can be pigmented or unpigmented. In the noncured state, a sealant is typically a pourable or easily extrudable putty-like material. In the cured state, the sealant is transfered into a true elastomeric material. When cured, sealants bond to a structural element and are able to contract or expand with motion. Sealants form a tight seal against moisture and other media.

Caulks are high solid content materials comprising pigments and fillers either with or without fibers uniformly mixed in a liquid vehicle to provide a consistency similar to a mastic. Caulks quite often are not elastomeric, are tacky and will remain soft to form a seal against moisture and other media.

A construction adhesive per the present invention shows excellent flexibility, superior to that obtained with an otherwise identical construction adhesive except using asbestos as a thixotropic agent.

The liquid material in the thixotropic composition of the present invention can, of course, be a solid which has been dissolved or dispersed in a carrier, diluent or solvent for the solid and, of course, when the thixotropic composition of the present invention is to yield an adhesive, sealant, mastic or caulk, this will generally be the case.

However, it is specifically contemplated that water and organic liquids in general can be rendered thixotropic using the leather fibers of the present invention, and the present inventiion should be construed as including such embodiments.

Since for most practical purposes the liquid will be an organic liquid, be it an organic liquid per se or an organic polymeric material or the like dissolved in a solvent or dispersed in a carrier or diluent, the majority of the discussion hereafter will be in the context of such an organic liquid. However, water is a specifically contemplated liquid material per the present invention.

Where the material of the present invention which is to be rendered thixotropic is itself "liquid", for example, having a relatively low viscosity, it is believed the same can be used without a solvent, carrier or diluent in combination with the leather fiber thixotropic agent of the present invention.

However, where the polymeric material is a high viscosity material itself, generally a carrier, diluent or solvent will be used in combination therewith, for example, water or an organic liquid such as is used in the paint, varnish or lacquer field, e.g., aliphatic and aromatic alcohols, ketones, and esters, for example, ethanol, acetone, methyl ethyl ketone, ethyl acetate, amyl acetate, and the like.

In the context of the present invention, the terms "carrier and diluent" are used interchangeably to mean a liquid, be it water or an organic liquid, which does not fully dissolve a polymeric material, i.e., the polymeric material may be carried therein in emulsion form or in dispersion form.

The difference between a carrier or diluent and a solvent is that a solvent will generally completely dissolve a polymeric material in yielding the thixotropic compositions of the present invention.

Classes of organic liquids which it is contemplated may be rendered thixotropic according to the present invention include organic film-formers, i.e., film-forming liquids such as liquids containing a dissolved organic film-forming or bonding solid or liquid which, on evaporation of such liquid or by polymerization during or after evaporation of such organic liquid, forms films, coatings or a binder which is capable of bonding two similar (e.g., glass fibers) or two dissimilar materials with a relatively high strength bond.

For example, it is contemplated that liquid coating compositions comprising solutions or suspensions of high molecular weight film-formers dissolved in a solvent may be thickened by dispersing in the solution form about 1% to about 20% by weight based on the weight of the solution of leather fibers. Also, it is contemplated that certain organic liquid polymers may be made thixotropic by dispersing therein from about 1% to about 20% by weight, based on the weight on the composition, of leather fibers.

Such compositions are generally employed as adhesives, films, foils, lacquers, paints, stretching lacquers (dopes) and the like, and it is contemplated they will comprise solutions or suspensions of high molecular weight organic film-formers such as, for example, nitrocellulose, cellulose acetate, chlorinated rubber, polyvinyl acetate, polyvinyl chloride, polyacrylic esters, cellulose butyrate, cellulose propionate and the like, and mixtures thereof, which are dissolved or suspended as fine particles in organic solvents or a carrier or diluent liquids such as, for example, acetone, ethanol, ethyl acetate, amyl acetate, dioctyl phthalate, etc., and mixtures thereof. Other materials are given in the Examples such as elastomers, polyolefins, etc. Natural rubber should also be useful.

The above organic film-forming compositions usually contain from about 1% to 95% by weight of film-formers dissolved or suspended in the organic solvent or liquid based on composition weight and may often have a dispersed phase of pigments and fillers. When it is desired that the above described liquid compositions be applied to objects in the form of a spray or spreadable liquid, the addition of from about 1% to about 20% by weight (depending upon the amount of film-forming materials in the composition) of the leather fibers of the present invention (based on composition weight) will cause the formation of a thixotropic gel composition almost immediately on contact with the object to which they are applied and such gel composition will then not run or drain from such objects.

Among the liquid organic resin compositions which it is contemplated may be employed with the leather fibers of the present invention to yield a thixotropic composition per the present invention are plastisol and latex compositions, e.g., comprising halogenated vinyl or vinylidine resins such as, for example, an emulsion polymerized polyvinyl chloride polymer suspended in a plasticizer such as a phthalate ester, for example, dioctyl phthalate, dibutyl phthalate, dihexyl phthalate, ethyl hexyl phthalate and the like, in which the plasticizer chosen is a plasticizer for the resin employed.

The leather fibers of the present invention (thixotropic agent) should also render thixotropic polymerizable organic liquid compositions comprising polymerizable resins including solventless varnishes and polyester resin compositions which are used in coating, filling, bonding and laminating operations. Such compositions include liquid alkyd resins or solutions of solid alkyd or polyester resins dispersed in a solvent (for example, styrene) which is usually copolymerizable with the alkyd or polyester resin.

Other organic resin liquids which should be useful in combination with the leather fiber thixotropic agent of the present invention include polymerizable liquids comprising unsaturated alkyd resins. These resins are the reaction products of (i) polyhydric alcohols, mixtures of polyhydric alcohols or mixtures of polyhydric and monohydric alcohols, and (ii) and $\alpha$ unsaturated $\alpha,\beta$-carboxylic acid, or a plurality of polycarboxylic acids, one of which at least is an unsaturated polycarboxylic acid. Examples of such polyhydric alcohols are ethylene glycol, di- and triethylene glycol, propylene glycol, tetramethylene glycol, glycerine or pentaerythrytol in combination with a monohydric alcohol, etc. Examples of unsaturated polycarboxylic acids are maleic, fumaric and itaconic acids. The term polycarboxylic acid as used herein is intended to include within its meaning the anhydrides of such acids which may also be employed. In addition to one or more of the unsaturated polycarboxylic acids, saturated polycarboxylic acids may also be present in the reaction mixture referred to above. Examples of such saturated polycarboxylic acids are succinic, adipic, sebacic, phthalic and terephthalic acids.

Instead of the above unsaturated alkyd resins, the polymerizable liquids which may be useful in the thixotropic compositions of the present invention may contain polymerizable substances such as, for example, esters of monohydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate, dibenzyl fumarate, and the like.

It is contemplated that the above described unsaturated resins may be liquids, or solids dissolved in organic liquids, and the thixotropic agent may be directly dispersed in the liquids. When the unsaturated resin is a solid, it is necessary to dissolve the resin in an organic solvent, preferably a solvent which is copolymerizable with the polyester resin, such as, for example, styrene or other liquid copolymerizable monomers, or disperse the same in a diluent.

Certain thixotropic compositions of this invention should be convertible into an infusible, insoluble state by means of heat alone, for example, by curing parts coated or filled with these compositions at temperatures of from about 80° C. to about 150° C., or more preferably from about 100° C. to about 125° C.

It is also contemplated that there may also be incorporated in the above described polymerizable liquid compositions containing the thixotropic agent of this invention conventional amounts of a polymerization catalyst. Many types of polymerization catalysts, well known to those skilled in the art, should be useful with the polymerizable liquid compositions of this invention including for example, benzoyl peroxide, methyl ethyl ketone peroxide, cyclohexane peroxide, and cumene hydroperoxide, which provide the free radical necessary to effect polymerization. The leather fibers of the present invention, since they can be used in essentially any application where prior art thixotropic agents have been used as a replacement therefor, should not require any variations in catalyst percentages from those used in the prior art systems.

Additional organic resin liquids which should be rendered thixothropic include the well known epoxy resins; that is, resins based on ethylene oxide or its homologues or derivatives. The epoxy resins may be considered polymers of epichlorohydrin and (a) bisphenol A[2,2-bis′(p-hydroxyphenyl)-propane, HOC$_6$H$_4$C(CH$_3$)$_2$C$_6$H$_4$OH] (b) ethylene glycol, (c) glycerol, and/or (d) related hydroxyl-containing compounds, and have both epoxide and hydroxyl groups, which are capable of further reaction with various modifiers or curing agents. These resins are usually pale amber in color and range from viscous liquids to brittle solids with softening points varying from 40° C. to 150° C. Several epoxy resins which should be suitable for use in conjunction with the leather fiber thixotropic agent of the present invention are commercially available under the trademarks Araldite, Bakelite, Epi-Rez, C-8, Devron and Epon. Those epoxy resins which are liquid may be thickened as in the case of the other organic liquids described above. However, if the resins are in solid form, then such resin may be dissolved and/or dispersed in a solvent, diluent or carrier and the resultant liquid resin-solvent mixture may be rendered thixotropic by the practice of the present invention. Furthermore, these liquid resin combinations may be utilized with suitable curing agents which are well known in the plastic art; for example, curing agents which may be mentioned include organic bases such as amines, acid anhydrides, and compounds containing active hydrogen.

The leather fiber thixotropic agent of the present invention should also be useful to render various oleaginous liquids thixotropic, for example, oils of animal and vegetable origin. Examples of the same include cod liver oil, olive oil, corn oil and the like. Also included in the oleaginous liquids are lubricating oils such as hydrocarbon motor oils which it is contemplated may be used in conjunction with the leather fiber thixotropic agent of the present invention to provide gel-like bodies having a grease consistency. It also contemplated that mixtures of the aforesaid oils may be thickened following the present invention.

It is contemplated that the present invention will be of advantage in providing thixotropic caulking compositions. One such composition which should prove to be useful will comprise a copolymer of styrene, butadiene and an organic unsaturated carboxylic acid, with optional organic and/or inorganic thickeners, and the leather fibers of the present invention. Useful copolymers and organic and/or inorganic thickeners are disclosed in U.S. Pat. No. 4,756,856 Hossenfelder, hereby incorporated by reference.

It is further contemplated that the leather fiber thixotropic agent of the present invention will be useful in providing mastic compositions, for example, a mastic composition comprising asphalt, a hydrocarbon polymer oil, an appropriate solvent and the leather fiber thixotropic agent of the present invention.

A further contemplated use for the leather fiber thixotropic agent of the present invention is a replacement for thixotropic agents in conventional oil well drilling fluids. In this regard, it is contemplated that the leather fiber thixotropic agent of the present invention can be used as a replacement for the viscosifying agents disclosed in U.S. Pat. Nos. 3,185,642 Sawyer et al; 3,856,310 Blackwell et al; 3,899,431 Hayes et al; 4,061,580 Jahnke; 4,402,881 Alther and 4,431,550 Block, all hereby incorporated by reference. It is further comtemplated that the leather fiber thixotropic agent can be used as a replacement for viscosifying agents in conventional pipe lining compounds as are utilized in oil well drilling art.

It is also contemplated that the leather fibers of the present invention can be used to render thixotropic protective coatings as are disclosed in U.S. Pat. No. 2,402,474 Van Dyck et al, hereby incorporated by reference, with, of course, the addition of an appropriate solvent.

The leather fibers of the present invention should also be useful as a complete replacement for the asbestos fibers in insulating materials in gel form as disclosed in U.S. Pat. No. 2,142,584 Ferguson, hereby incorporated by reference. Such compositions maintain their liquidity upon application from a hose or gun but, by the time the composition hits the desired area of application, it becomes a sticky, semi-solid mass which will not readily flow. This is advantageous as it means that the composition will adhere firmly to the surface on which it is applied without slipping or slumping.

It is also contemplated that the leather fiber thixotropic agent of the present invention will be useful in compositions which are injected into a pneumatic tire to enable the same to run safely in a deflected condition or in analogous applications, for example, as disclosed in U.S. Pat. No. 4,137,206 Kent, incorporated by reference, in U.S. Pat. No. 4,051,884 Bourne et al incorporated by reference, and in like compositions.

Further in accordance with the present invention, if desired (though this is not mandatory) various additives other than the earlier described curing agents can be added. For example, cationic, anionic and nonionic surfactants in addition to various pigments and fillers as earlier described. It is believed that such surfactants when used will normally be used in relatively minor amounts as are conventional in the art.

Fillers and pigments may be present in the thixotropic composition of the present invention in amounts up to the point where the thixotropic properties thereof are not substantially reduced.

Such fillers and pigments are not in themselves capable of affording thixotropic compositions when mixed with the liquid to be rendered thixotropic. Examples of such fillers and pigments should include silex or sand, talc, Carborundum, Alundum, litharge, iron powder, zirconium oxide, calcium tungstate, tungsten oxide, nickel oxide and the like. The use of the above fillers and pigments should offer a convenient method of obtaining the thixotropic characteristics of the present compositions while retaining a high total filler or pigment content and utilizing to advantage whatever outstanding physical property (dielectric, moisture resistance, hardness, tensile strength, toughness, etc.) that the filler or pigment may contribute to the final product.

The source of the leather which is fiberized per the present invention to yield the leather fiber thixotropic agent of the present invention is not overly important. However, as will be apparent to one skilled in the art, for economic reasons the starting material is most advisably a leather waste material from the manufacture of conventional leather products, e.g., shoes, belts, handbags, and the like.

Since it is most preferred to use leather waste as a starting material per the present invention, and since such normally contains undesirable non-leather materials, before fiberizing the leather starting material will generally be cleaned to remove any foreign matter which might be present. This can be done on a conventional manner such as by washing in water or a chemical solvent, etc.

Examples of most typically encountered leather waste materials include blue shavings, finished leather scrap or trimmings, buffing dust and blue drops (blue indicates the leather has been chrome tanned).

It is necessary that the leather fibers be stable, that is, not degrade or putrify during use. Accordingly, for practical purposes, the leather will be tanned. While our work has mostly involved leather from cattle hides, we see no reason why leather from other sources will not be sucessfully used in the present invention, for example, kid leather, sheep leather, leather from reptiles such as alligators, crocodiles, and the like, and mixtures thereof which can be chrome tanned, alum tanned, vegetable tanned, etc. As a general rule, we prefer to use cattle hide leather in the present invention.

Although tanned leather products are preferred since the product is stable, based on results to date the tanning method used appears to have little, if any, effect on the efficacy of the leather fiber thixotropic agent of the present invention during final use.

Once foreign matter is generally removed, the leather, be it virgin leather or leather waste, can be fiberized in the wet form or after drying the same. Whether the leather is wet or dry when fiberized does not appear to have any impact on the fiberizing process.

It is most preferred, however, that the final leather fiber thixotropic agent of the present invention be relatively dry, for example, contain on the order of about one (1%) to about ten (10%) percent water, more preferably from one (1%) to about four (4%) percent water, based on leather weight.

Since we most often use a dry fiberizing, we will generally dry the leather. Drying conditions are not important and are basically selected so as to correlate with the apparatus used which is most typically a conventional drying oven.

Leather may be fiberized per the present invention using any conventional apparatus or conventional procedure to result in the desired leather fibers. Exemplary procedures include wet fiberizing in water, wet fiberizing in an organic solvent, e.g., 1,1,1-trichloroethane, dry buffing fiber obtained from chrome tanned and organic tanned leathers (both of these materials are conventional), dry fiberizing using a Turbo Mill, e.g., as available from Bauermeister or using a Hammer Mill, e.g., as available from C. E. Raymond under the name Raymond #51 Imp Mill, all of which result in shredding the leather. As will be apparent to one skilled in the art, other alternative procedures and devices can be used. Also, the leather fibers can be fiberized using a multi-step procedure, e.g., one can first use a low speed cross beater mill and then a high speed Turbo Mill.

Following fiberizing, the leather fibers are classified in a conventional manner to yield leather fibers which most desirably exhibit a size range to serve as the thixotropic agent of the present invention. Classification should, of course, eliminate any leather fines (powder) which are not in fibrous form and should eliminate any material which is too large to provide the desired thixotropic effect of the present invention. Classification can be affected using any conventional apparatus known in the art e.g., screening pans, air floatation, etc.

The leather fiber (thixotropic agent) of this invention must be fibrous in form or structure to effect or impart any appreciable thixotropic effect at relatively low concentrations and reducing the fibers to a powder-like configuration by grinding or the like results in a material which at low concentration merely settles out of the liquid phase with essentially no over-all thixotropic effect.

Leather fibers appear to be different from fibers of a material such as asbestos. Leather fibers are "curly" and circular in nature. Upon shredding (fiberizing) leather, the fibers pull apart but do not seem to stretch.

The leather fiber thixotropic agent of the present invention may, of course, be used in combination with conventional thixotropic agents, if desired. Mixing proportions are not overly important except, of course, as higher and higher percentages of a conventional thixotropic agent(s) is/are used, the effect of the leather thixotropic agent of the present invention will be lessened.

So long as the leather has been fiberized, there does not appear to be any critical cut-off value to achieve thixotropic properties per the present invention in the sense that if at one point thixotropy is achieved and at a very close point thixotropy is not achieved. As later explained, "pan" materials, i.e., leather fibers which seem to completely remain in the form of bundles or spheres, do not provide the thixotropic effect of the present invention. In fact, a small bundle of leather fibers, comprising only a few leather fibers, seems to function in a manner somewhat similar to a leather fiber with respect to thixotropic properties although the thixotropic properties are not as good as we obtained with complete fiberization. On the other hand, a large leather fiber bundle, that is, one which has not been fiberized to any substantial extent, does not provide the thixotropic properties of the present invention. Thus, in the claims herein we use the terminology "consisting essentially of" to reflect the fact that if we obtain the desired thixotropic effect, such leather fibers are within the present invention, whereas if we do not obtain the desired thixotropic effect, the leather is not considered a leather fiber in the context of the present invention.

To date, based on data generated from an independent research organization, the exact length, diameter or aspect ratio of the leather fibers of the present invention does not appear to be overly important in the sense of there being a critical cut-off point on any of these parameters. However, we have noted what appear to be certain general trends from the data referred to, and we now briefly discuss these. The length of the leather fibers does not appear to be an important parameter. In distinction, the diameter and, more particularly, the aspect ratio of the leather fibers appears to have a more significant effect. In general, the higher the aspect ratio the better the thixotropic properties obtained. We do not wish to be bound since the data we have are limited, but the data seem to suggest that as the aspect ratio increases better thixotropic properties are achieved. By extrapolation from the data we have, an aspect ratio of about 12 or more seems to provide good results and an aspect ratio of 20 or more seems to provide excellent results.

As will be appreciated by one skilled in the art, the rate of shear applied during mixing to form a thixotropic composition per the present invention can affect the final thixotropic index of the composition. However, in this regard, conventional mixing procedures are used to form the thixotropic composition of the present invention, i.e., mixing procedures in accordance with the prior art. Thus, per the present invention, the thixotropic compositions are formed using a shear sufficient to render the composition thixotropic. Exact conditions will be obvious to one skilled in the art.

Thus, the dispersion methods useful for the incorporation of the leather fiber thixotropic agent of the present invention into liquids are generally well known and understood. Depending somewhat on the particular liquid to be rendered thixotropic, relatively passive dispersion by "low shear" mixing methods such as by hand-stirring will often, it is believed, be satisfactory. However, it is also believed that it will often be advantageous to disperse the composition by means which impart substantial quantities of shear to the system such as roll mills, high speed blenders, ultrasonic mixers, and the like. Further, if desired, the liquids to be rendered thixotropic can generally be heated in order to facilitate the incorporation of the leather fiber thixotropic agent of the present invention thereinto.

Having thus generally described the invention, the following working examples are offered to present currently preferred best modes of practicing the invention.

The leather fiber thixotropic agent used in Examples 1 and 2 was obtained by cleaning, drying and fiberizing conventional blue shavings (chrome tanned cattle leather). The chrome tanned cattle leather had a size of about $1''\times\frac{1}{8}''\times 1/16''$. This is not an important parameter, though as one skilled in the art will appreciate the larger the size of the starting blue shavings, the longer fiberizing will take, and this may be a process parameter that one skilled in the art will wish to consider.

Drying was in an oven in the air at 100° C. for 12 hours. Drying conditions can be freely varied, of course.

Fiberizing was by a dry procedure. The blue shavings were passed twice through a conventional cross beater available from Bauermeister, Inc. The rotor speed was 5200 rpm and a 3 mm screen was used. Fiberizing conditions can be freely varied of course.

In this particular instance, since we were working on a laboratory scale, the only cleaning of the starting material leather fibers was to remove metal particles by hand. On a production scale, of course, there might well be large pieces of leather which could be screened out. A magnetic conveyor might also be used to remove iron-based particles.

The resulting leather fibers were then screened following the procedure of ASTM D-2947-74 (Reapproved 1980) using a screen pan having US Screen Sizes of 9, 28, 35 and pan (the screen size number reflects the number of screen openings per square inch; pan is material which passes through the three screens). The resulting fibers were designated as leather A (retained on screen 9), B (retained on screen 28), C (retained on screen 35) and D (pan).

Analysis of these leather samples provided the following results:

| Sample | 50%* | 10% > or 90% < ** |
|---|---|---|
| Length (mm) | | |
| A | .16 | .53 |
| B | .17 | .57 |
| C | .16 | .54 |
| D | .13 | .47 |
| Diameter (mm) | | |
| A | .0057 | .014 |
| B | .0062 | .022 |
| C | .0077 | .051 |
| D | .0076 | .046 |
| Aspect Ratio (length/diameter; median value) | | |
| A | 24 | |
| B | 22 | |
| C | 13.5 | |
| D | 11.0 | |

*Median values; half of the fibers are below this value and half are above.
**10% (numerical) of the fibers are greater than this value or 90% (numerical) of the fibers are less than this value.

We wish to emphasize that leather fibers differing in dimensions in the above fibers can be used, though, of course, true fines or particulate (ground) leather is not useful per the present invention.

Leather A was used in later provided Examples 1 and 2. Mixtures of various leathers can, of course, also be used, and this should provide a convenient means to customize the leather thixotropic agent for any particular application.

To data, we have generally achieved better results, from the viewpoint of thixotropic properties (higher viscosity), in the following order:

Leather A > Leather B > Leather C > Leather D.

The order specifically reflects a decreasing thixotropic index (TI) from Leather A to Leather D, with Leather D giving a TI on the order of 1. The pan leather can, of course, be refiberized and reclassified to obtain leather fibers useful per the present invention. While not limiting, we generally seek a TI of about 1.6 to about 1.8 or even as high as about 2.0, though this will vary depending upon the material used, as this provides thixotropic properties as good as or better than most currently available thixotropic agents. Most superior results were obtained with Leather A which gave a viscosity over twice that of Leather B. We do not consider Leather D to provide acceptable thixotropic properties if used alone, though in theory Leather D might be used as a "diluent" if for some reason one did not wish to refiberize the same and reclassify the same.

TI is determined in a conventional manner and it is determined herein on a Brookfield RVT Viscometer using a No. 6 spindle. Three grams of leather fiber is dispersed in 100 g of Chlorowax 40 to prepare the test sample. TI is the ratio of the viscosity at 5 rpm/viscosity at 20 rpm.

When the aspect ratio of each of leather fibers A–C was plotted against viscosity, a relatively straight line resulted. However, we wish to emphasize that the present invention is not limited with respect to any particular minimum aspect ratio as the critical point of the present invention resides in the use of leather fibers.

Our most recent data show the following results:

| Leather | Viscosity (cps × 10³) | | TI |
|---|---|---|---|
| | 5 rpm | 20 rpm | |
| A | 46 | 20.5 | 1.804 |

-continued

| Leather | Viscosity (cps × 10³) | | TI |
|---|---|---|---|
| | 5 rpm | 20 rpm | |
| B | 36 | 21.25 | 1.694 |
| C | 20 | 12 | 1.666 |
| D | 7.75 | 6 | 1.292 |

As will be appreciated from the above discussion, we currently prefer to essentially completely fiberize any leather which is used, i.e., to break up all leather fiber bundles present. The presence of some leather fiber bundles does not appear to be overly harmful, but it appears that the more individual leather fibers we obtain through fiberizing, the better the thixotropic effect.

Figure 1:
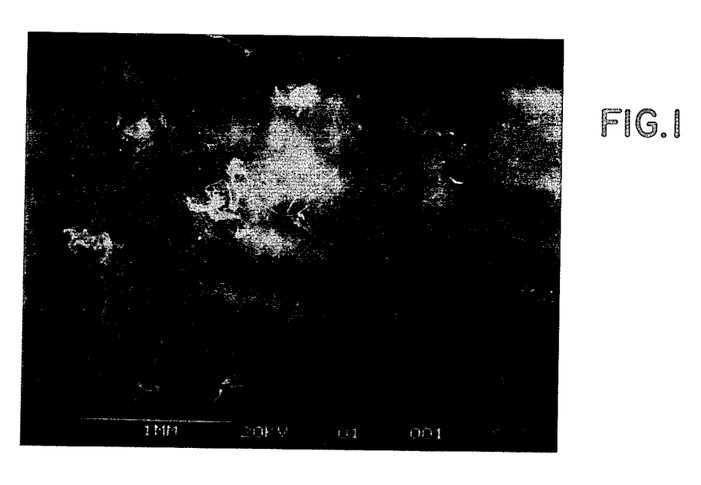
FIGS. 1 to 8 aare photographs of leather fibers A, B, C and pan material D at magnifications as shown in the photographs.
Figure 2:
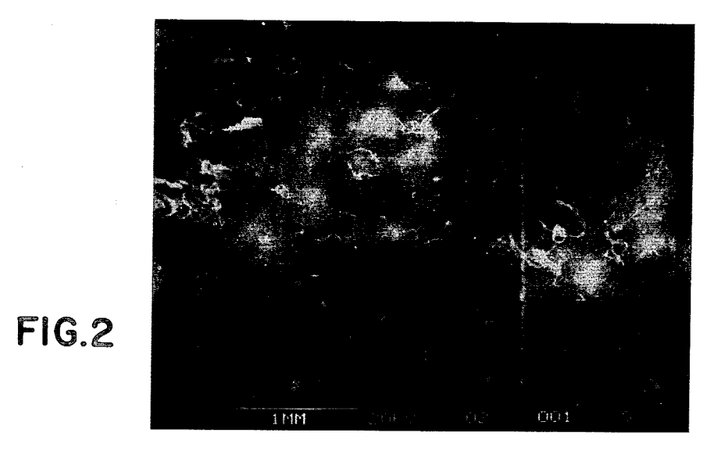
Figure 3:
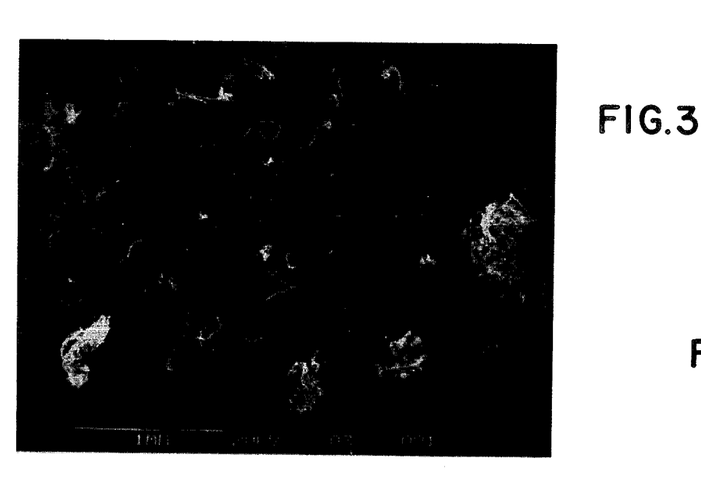
Figure 4:
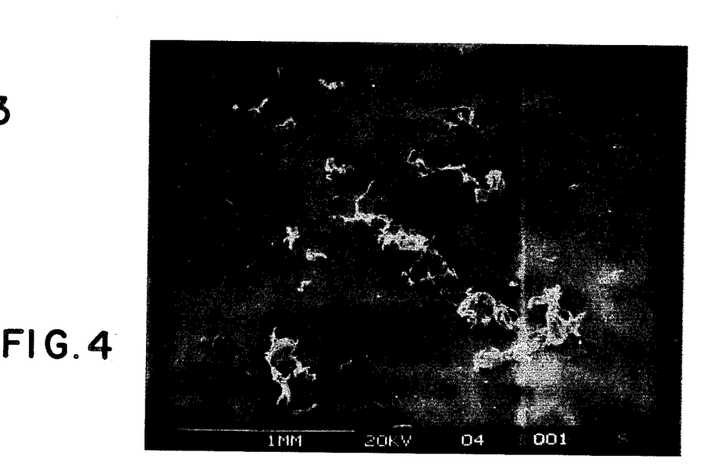
Figure 5:
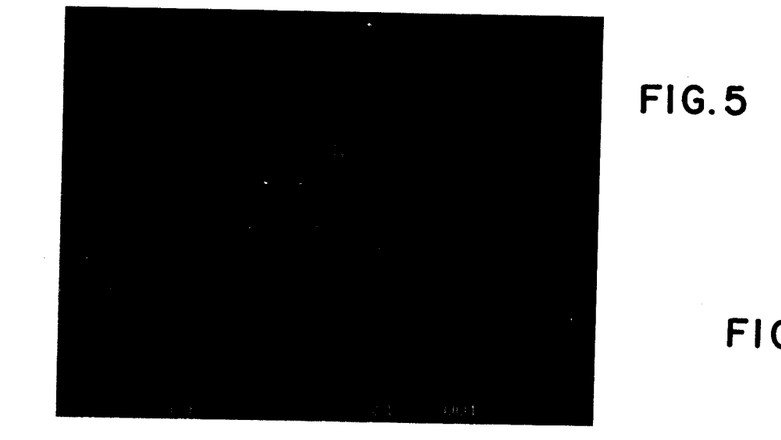
Figure 6:
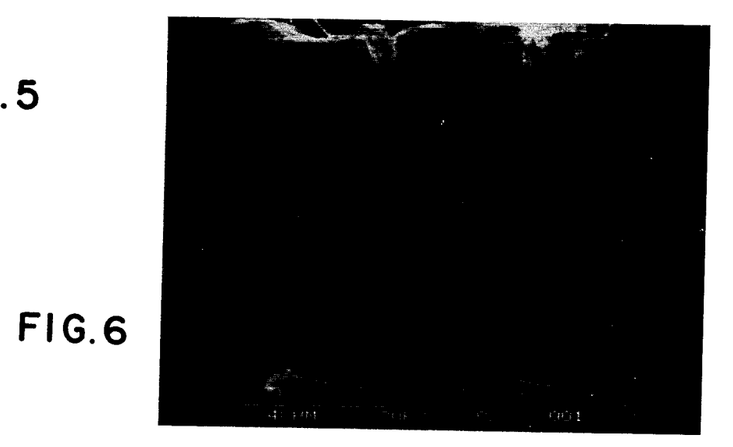
Figures 7, 8:
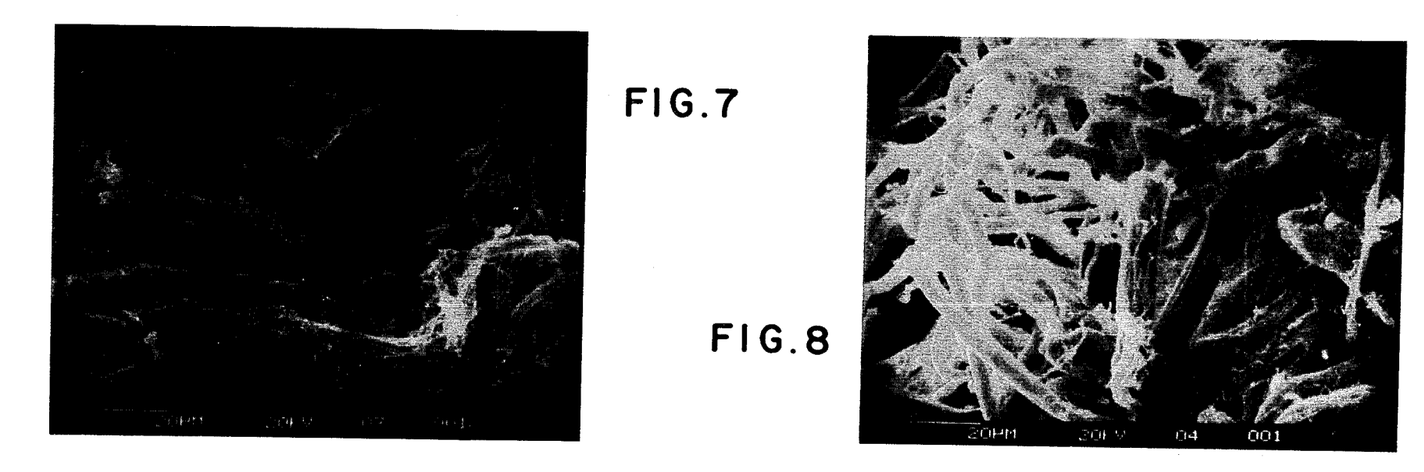

Photographs at two different magnifications of leather fibers A, B, C and pan leather D were taken.

FIGS. 1–4 are photographs of leather fibers A, B, C and pan leather D, respectively, with the scale at 1 mm being shown.

FIGS. 5–8 are photographs of leather fibers A, B, C and pan leather D, respectively, with the scale at 40 μm being shown.

Most especially from FIGS. 5–8 it is seen that leather A has been more highly fiberized than the other leather samples with pan leather D showing a substantial lack of fiberization.

Although on a larger scale, similar characteristics are seen in FIGS. 1–4.

Figure 9:
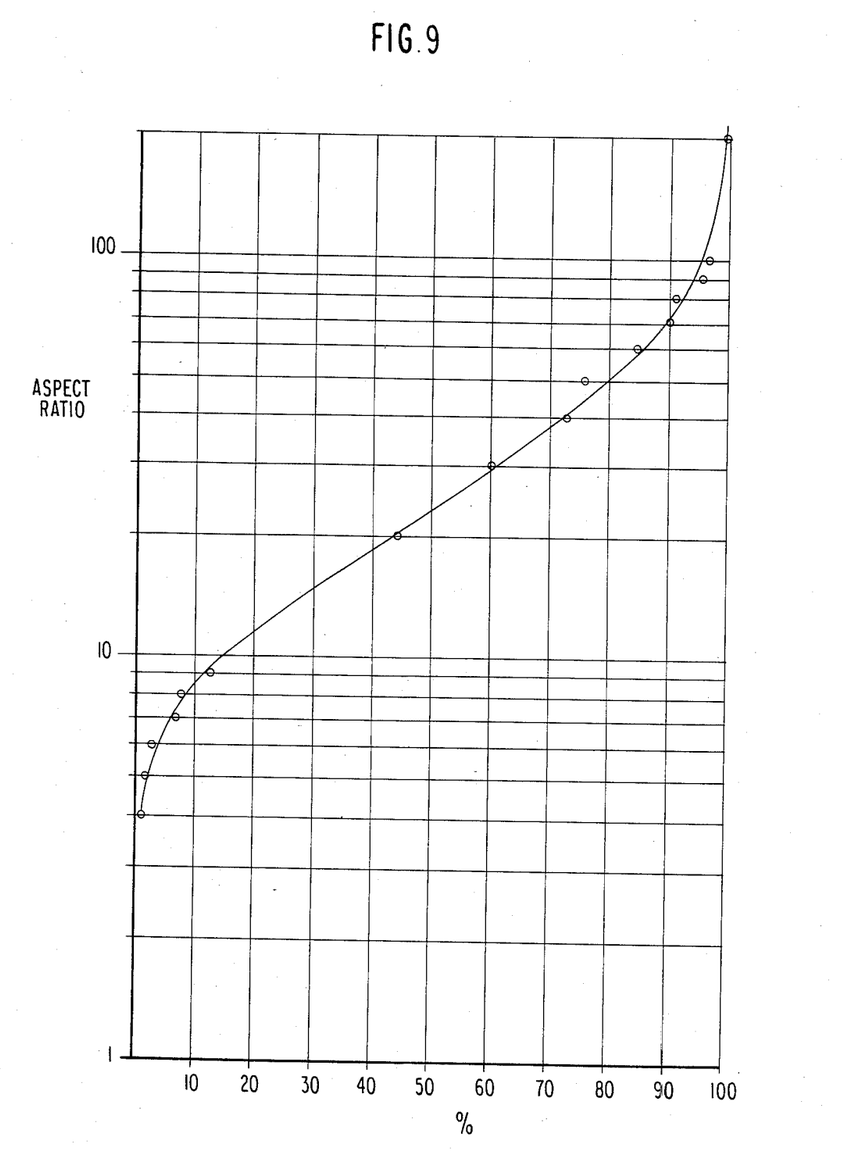
FIGS. 9 to 12 are graphical presentations of the aspect ratios of leather fiber samples A, B and C and pan leather D, as later described, versus percent.
Figure 10:
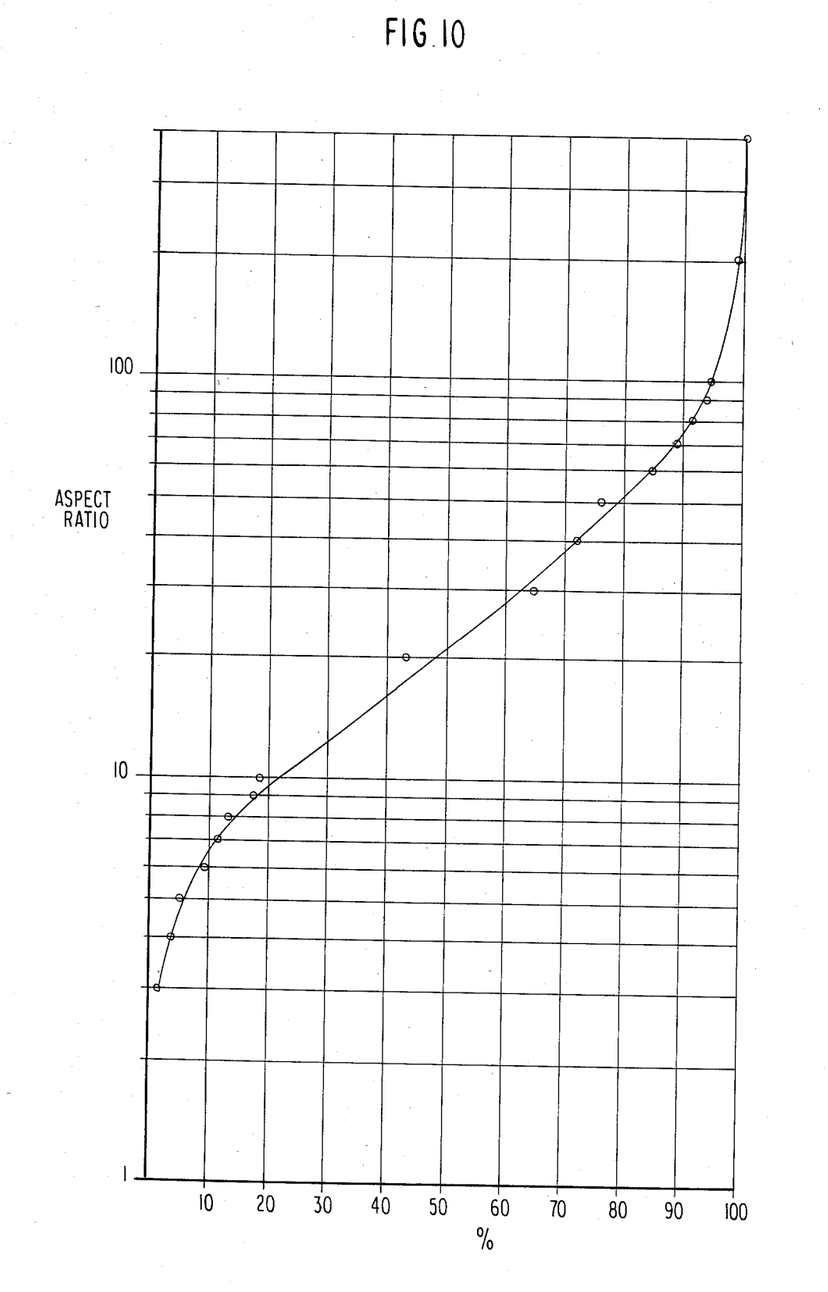
Figure 11:
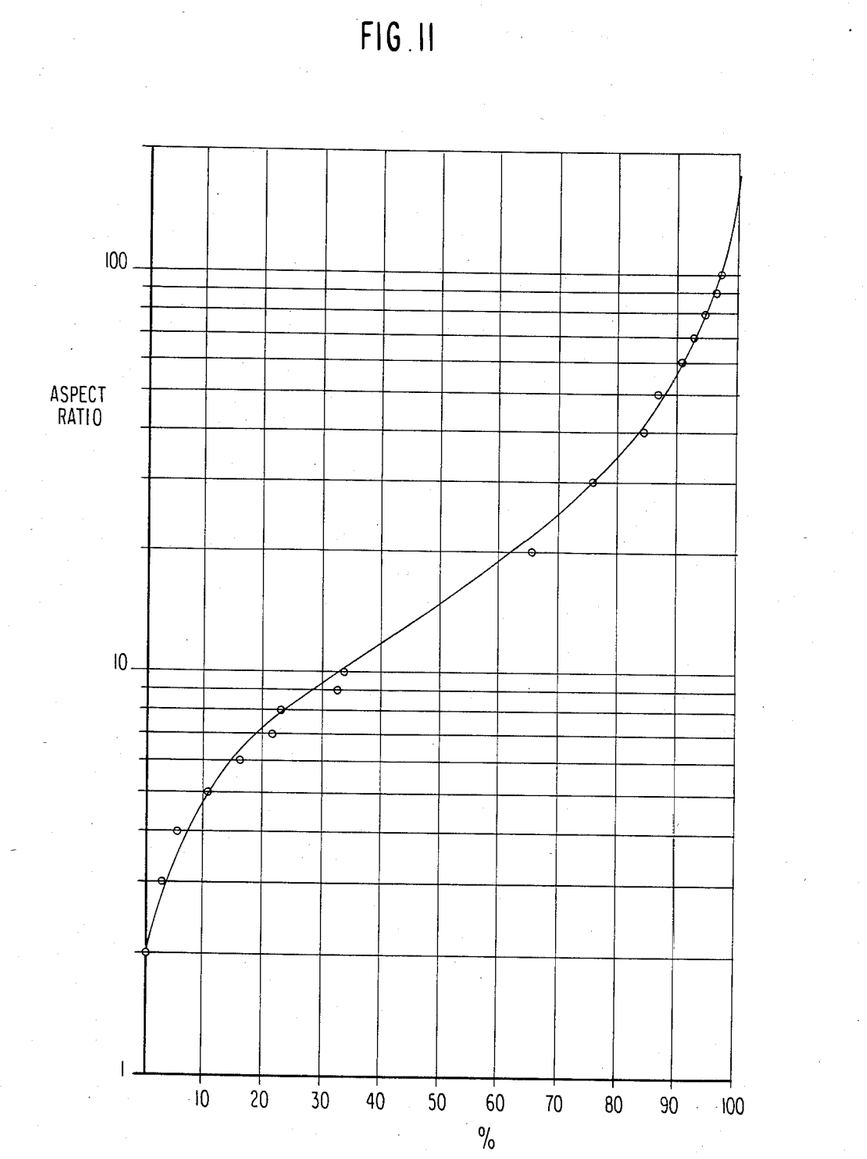
Figure 12:
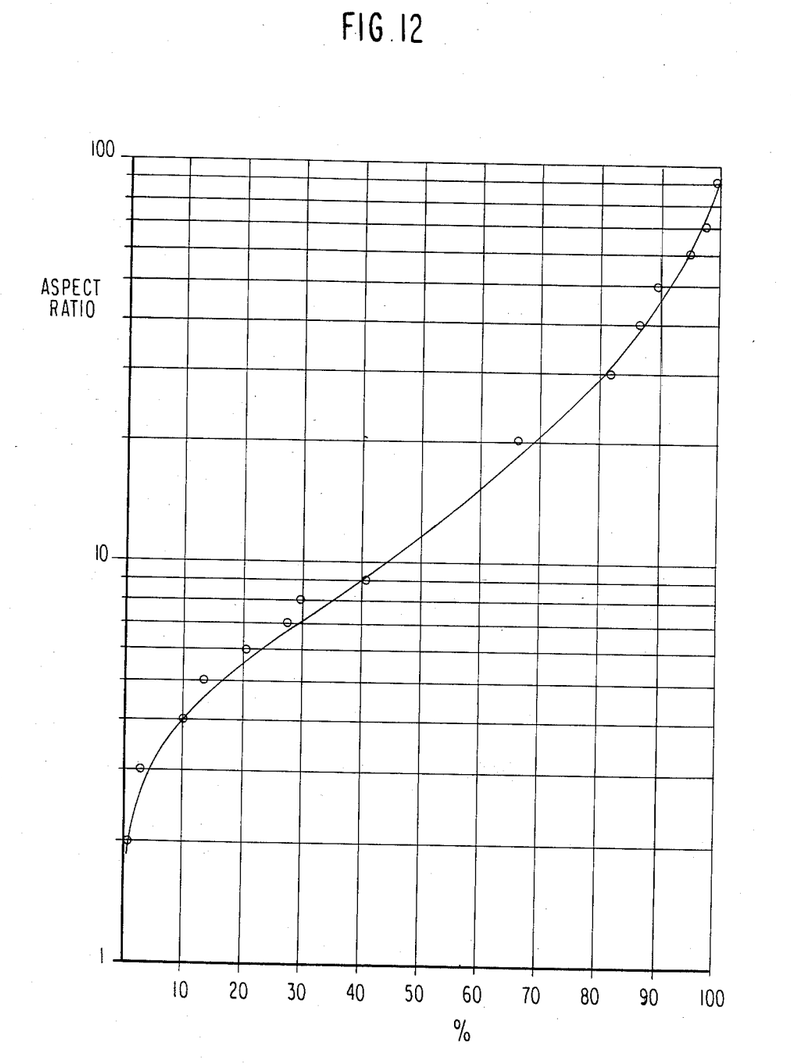

The aspect ratios of the leather fibers in leather fibers A, B, C and in pan leather D were also measured. The results are presented in FIGS. 9–12 for leather fibers A, B and C and pan leather D, respectively.

Unless otherwise indicated, all molecular weights were determined using the Staudinger solution viscosity method.

EXAMPLE 1

Unless otherwise indicated, all procedures were at ambient conditions and all percentages, parts, etc., are by weight.

The desired product in this Example is a thixotropic construction adhesive for styrofoam having a solids content of 68% based on composition weight.

Mixing was performed using a Baker-Perkins mixer with a small double arm. Stirring was vigorous, i.e., on the order of 60 rpm. The exact mixing apparatus selected and the conditions of mixing are not overly important so long as the desired homogeneous composition is obtained.

The first styrene-butadiene rubber used Solprene 1205 available from Phillips Chemical Co. It had a specific gravity of 0.93, a Mooney viscosity of 42–52 at 212° F. and comprised 75% butadiene and 25% styrene. The second styrene-butadiene rubber used was SBR 1006 available from BF Goodrich Chemical Co. It had a specific gravity of 0.94, a Mooney viscosity of 50 at 212° F. and comprised 76.5% butadiene and 23.5% styrene.

A small portion of the antioxidant Wing Stay S available from Goodyear Chemical Co. was also used. It was a styrenated phenol which had a specific gravity of 0.90.

The hydrocarbon resin used was Escorez 2101. It is available from Exxon Chemical Co. and is an aromatic-/aliphatic resin having a softening point of 90° to 96° C. (R & B), an aniline point of 34° C., an acid number (mg KOH/g) of less than 1, a saponification number (mg KOH/g) of less than 1, a weight average molecular weight of 925 and a number average molecular weight of 525.

The solvent used was isohexane available from Phillips Chemical Co.

Clay was added as a filler (inert). It was ASP 100 available from Engelhard Chemical Co. It comprised hydrous aluminum silicate [silicon ($SiO_2$)=45.4; aluminum ($Al_2O_3$)=38.8, (balance, other silicates)]. It had a specific gravity of 2.58 and an average particle size of 0.55 micron.

Firstly, 40 parts of the Solprene 1205 and 60 parts of the SBR 1006 (sytrene butadiene rubbers) were added to 180 parts of the isohexane and completely dissolved therein while mixing.

Nextly, 150 parts of the Escorez 2101 were added to the mixture along with 2 parts of the antioxidant and the system mixed until all components were again dissolved.

20 parts of leather fiber A and 201 parts of the clay (ASP 100) were added and the system again mixed until the clay was completely wetted out, i.e., until the system was homogenous and there were no globs in the system.

45 parts of isohexane were then added and the mixing continued until a homogenous thixotropic construction adhesive for styrofoam was obtained.

If the solvent is added at one time, the system tends to "liver out", i.e., tends toward phase separation. Since the mixing time for best results was about 6 hours on our laboratory scale, once the viscosity is decreased, additional solvent can be added much more rapidly. Accordingly, over about the first 15 minutes of mixing only about 10% of the solvent is added. Thereafter, the system can be seen to become "softer" (this is visually observable) and less grinding force is required for the blades of the mixer to move. Thereafter, the solvent can be added at a more rapid rate, depending upon the operator's convenience, to form the final composition. There are essentially only two parameters to consider here. First, one wishes to avoid phase separation by adding too much solvent at the early stages of the mixing and, therafter, one wishes to complete the mixing to a homogeneous system as quickly as possible. For any particular system, these parameters are easily determined by one skilled in the art.

The resulting product had a viscosity (Brookfield RVT Viscometer, No. 7 spindle) at 2.5 rpm of 864,000 cps and at 5 rpm at 584,000 cps.

Its thixotropic properties and adhesive properties were excellent.

EXAMPLE 2

This Example illustrates the formation of a thixotropic butyl caulk per the present invention. It had a solids content of 76.31% based on total composition weight.

The butyl rubber used was 065 Butyl Rubber available from Exxon Chemical Co. It had an average molecular weight of 350,000 a specific gravity of 0.92 and comprised 97% isobutylene and 3% isoprene.

The amorphous polypropylene used was AFAX 500 available from Hercules Chemical Co. It had a density (lbs/gal) of 7.2, a softening point (ring and ball) of 302° F.and an average molecular weight of 23,000.

The polyethylene used was Epolene N 10 available from Eastman Chemical Co. It had a softening point (ring and ball) of 111° C., a molecular weight of 2,500 and a density at 77° F. of 0.927.

The hydrocarbon resin used was Wingtack 95 available from Goodyear Chemical Co. It had a specific gravity of 0.93, a softening point of about 95° C., an acid number of 1.0 and an iodide number approximately 100.

The calcium carbonate used was Snowflake available from Thompson-Weimann Chemical Co. This product is 98% calcium carbonate, has a specific gravity of 2.71 and a particle size of up to 25 microns.

The titanium dioxide used is commercially available from NL Chemicals under the trade name TITANOX and was 98% minimum titanium dioxide exhibiting a specific gravity of about 3.9. Its average particle size was 0.25 micron.

The polybutene used was Indopol H 300 available from Amoco Chemical Co. It had an average molecular weight of 1,290, a viscosity at 100° F. of 627–675 cs, a specific gravity (60° F.) of 0.894 and a flash point of 525° F.

A conventional petroleum solvent was used (Varsol) having a flash point of 105 TCC°F., an aniline point of 134 and a specific gravity of 0.77. It comprised 50.6% paraffins, 34% naphthenes and 15% aromatics.

Leather fiber A was the thixotropic agent.

100 parts of the butyl rubber, 55 parts of the hydrocarbon resin, 45 parts of the polyethylene and 100 parts of the amorphous polypropylene were added to the petroleum solvent in a heavy-duty mixer. Heat was supplied during the addition of the above components to a petroleum solvent until the resulting mass reached a temperature of about 200° F. Mixing was continued until the mass became homogeneous.

Heating was then discontinued and cooling water circulated through the jacket of the mixer until the temperature reached 100°~125° F.

700 parts of the calcium carbonate, 45 parts of the titanium dioxide, 50 parts of leather fiber A and 100 parts of the polybutene were then added at the above temperature and mixing continued until a uniform mass was then again obtained.

371 parts of the Varsol solvent was added slowly over the above procedures with the rate of solvent addition increasing as the mass obtained lowered in viscosity as per Example 1.

The resulting product was an excellent thixotropic butyl caulk; it exhibited a viscosity (Brookfield RVT Viscometer, No. 7 spindle, 1 rpm) of 1,920,000 cps.

While the invention has been described in detail and with reference to specific embodiments thereof, it will be apparent to one skilled in the art that various changes and modifications can be made therein without departing from the spirit and scope thereof.

What is claimed is:

1. A thixotropic composition comprising:
   (1) a liquid; and
   (2) a thixotropic agent consisting essentially of leather fibers in an amount sufficient to render the liquid thixotropic.

2. The thixotropic composition of claim 1 wherein the leather fibers have an average aspect ratio of at least about 12.

3. The thixotropic composition of claim 1 wherein the leather fibers have an average aspect ratio of at least about 20.

4. The thixotropic composition of claim 1 comprising from about 1 weight % to about 20 weight % leather fibers based on the weight of the composition.

5. The thixotropic composition of claim 1 wherein the liquid comprises an organic polymer in a solvent.

6. The thixotropic composition of claim 1 wherein the leather fibers are tanned leather fibers.

7. The thixotropic composition of claim 1, wherein the thixotropic composition is a coating.

8. The thixotropic composition of claim 1, wherein the thixotropic composition is an adhesive.

9. The thixotropic composition of claim 1, wherein the thixotropic composition is a sealant.

10. The thixotropic composition of claim 1, wherein the thixotropic composition is a mastic.

11. The thixotropic composition of claim 1, wherein the thixotropic composition is a caulk.

12. The thixotropic composition of claim 1, wherein the liquid comprises an organic polymer in a diluent.

13. The thixotropic composition of claim 1, wherein the liquid comprises an organic film-forming polymer.

14. The thixotropic composition of claim 13, wherein the liquid comprises about 1 to about 95% by weight organic film-forming polymer based on the weight of the thixotropic composition.

15. The thixotropic composition of claim 1, wherein the leather fibers are tanned cattle hide leather fibers.

16. The thixotropic composition of claim 1, wherein the leather fibers have an average aspect ratio of at least about 12, the composition comprising about 1 wt% to about 20 wt% leather fibers based on the weight of the composition, said composition thickening and changing rapidly, on standing, from a liquid into a gel-like solid mass, but said gel being fluidized by the application of mechanical agitation.

17. The thixotropic composition of claim 1, which is formed by applying a substantial quantity of shear to the thixotropic composition.

18. The method of rendering a liquid thixotropic which comprises admixing therewith a thixotropic agent consisting essentially of leather fibers in an amount sufficient to render the liquid thixotropic.

19. The method of claim 18, wherein the leather fibers have an average aspect ratio of at least about 12.

20. The method of claim 18, wherein the leather fibers have an average aspect ratio of at least about 20.

21. The method of claim 18, wherein about 1 wt.% to about 20 wt.% leather fibers are admixed with the liquid based on the weight of the resulting composition.

22. The method of claim 18, wherein the liquid comprises an organic polymer in a solvent.

23. The method of claim 18, wherein said leather fibers are tanned leather fibers.

24. The method of claim 18, wherein the resulting composition is a coating.

25. The method of claim 18, wherein the resulting composition is an adhesive.

26. The method of claim 18, wherein the resulting composition is a sealant.

27. The method of claim 18, wherein the resulting composition is a mastic.

28. The method of claim 18, wherein the resulting composition is a caulk.

29. The method of claim 18, wherein the liquid comprises an organic polymer dispersed in a carrier.

30. The method of claim 29, wherein the organic polymer is an organic film-forming polymer.

31. The method of claim 30, wherein about 1 to about 95% by weight of the organic film-forming polymer is present based on composition weight.

32. The method of claim 8, wherein said leather fibers are tanned cattle hide leather fibers.

33. The method of claim 18, wherein the thixotropic liquid contains leather fibers which have an average aspect ratio of at least about 12, the thixotropic liquid comprises about 1 wt% to about 20 wt% leather fibers based on the weight of the thixotropic liquid, said thixotropic liquid thickening and changing rapidly, on standing, from a liquid into a gel-like solid mass, but said gel being fluidized by the application of mechanical agitation.

34. The method of claim 18, wherein said liquid is rendered thixotropic by applying a substantial amount of shear to said liquid.

35. A method of forming a thixotropic composition which comprises:
fiberizing leather;
admixing the resulting leather fibers with liquid in an amount effective to render the liquid thixotropic.

36. The method of claim 35, wherein the leather fibers have an average aspect ratio of at least about 12.

37. The method of claim 35, wherein the leather fibers have an average aspect ratio of at least about 20.

38. The method of claim 35, wherein about 1 wt.% to about 20 wt.% leather fibers are admixed with the liquid based on the weight of the resulting composition.

39. The method of claim 35, wherein the liquid comprises an organic polymer in a solvent.

40. The method of claim 35, wherein said leather fibers are tanned leather fibers.

41. The method of claim 35, wherein the resulting composition is a coating.

42. The method of claim 35, wherein the resulting composition is an adhesive.

43. The method of claim 35, wherein the resulting composition is a sealant.

44. The method of claim 35, wherein the resulting composition is a mastic.

45. The method of claim 35, wherein the resulting composition is a caulk.

46. The method of claim 31, wherein the liquid comprises an organic polymer dispersed in a carrier.

47. The method of claim 46, wherein the organic polymer is an organic film-forming polymer.

48. The method of claim 47, wherein about 1 to about 95% by weight of the organic film-forming polymer is present based on composition weight.

49. The method of claim 35, wherein said leather fibers are tanned cattle hide leather fibers.

50. The method of claim 35, wherein said thixotropic composition comprises about 1 wt% to about 20 wt% leather fibers based on the weight of the composition, said composition thickening and changing rapidly, on standing, from a liquid into a gel-like solid mass, but said gel being fluidized by the application of mechanical agitation.

51. The method of claim 35, wherein said admixing is under conditions or substantial shear.

* * * * *